United States Patent [19]

Barrie

[11] 3,800,640
[45] Apr. 2, 1974

[54] APPARATUS AND METHOD FOR CUTTING A TRAVELLING WEB OF MATERIAL

[76] Inventor: Arnold Varden Barrie, 8 Ottaway Ave., Ontario, Canada

[22] Filed: Feb. 5, 1973

[21] Appl. No.: 329,662

[52] U.S. Cl............................ 83/37, 83/42, 83/49, 83/344, 83/346, 83/348, 83/659
[51] Int. Cl............................ B26d 1/36, B26d 1/40
[58] Field of Search.......... 83/37, 42, 49, 344, 346, 83/348, 659, 345, 341

[56] References Cited
UNITED STATES PATENTS

| 3,073,196 | 1/1963 | Marcalus | 83/346 X |
| 3,340,778 | 9/1967 | Boone et al. | 83/659 X |
| 3,425,307 | 2/1969 | Doerman | 83/346 |

Primary Examiner—Frank T. Yost

[57] ABSTRACT

As a web of material travels between a conventional cutting head and an anvil unit a straight cutting edge of a rotating blade of the cutting head presses the web against the anvil unit and thereby cuts the web. The cutting edge and the web move together at the same rate over the anvil unit. The anvil unit has a plurality of identical parallel idler rollers resiliently mounted to avoid undercutting or scarring by the cutting edge and aligned at a relatively large oblique angle with respect to the cutting edge so as to reduce banging of the cutting edge against the anvil unit and thereby reduce dulling of the cutting edge. The rollers are arranged side-by-side so that every part of the width of the web passes over some part of a roller against which it can be cut by the cutting edge. Perforations or continuous cuts extending across the entire width of the web can be made.

15 Claims, 3 Drawing Figures

APPARATUS AND METHOD FOR CUTTING A TRAVELLING WEB OF MATERIAL

BACKGROUND OF THE INVENTION

1. Field of the Invention:

The present invention relates to an apparatus and method for cutting a travelling web of material. In particular, the present invention relates to an apparatus and method for making perforations and continuous cuts in the web normal to the general direction of web travel.

2. Description of the Prior Art:

It is known that the dulling of a straight cutting edge as it bangs against an idler roller to cut a web of material travelling over the roller can be reduced by arranging the axis of the roller at an angle with respect to the cutting edge so that all portions of the cutting edge do not strike the roller simultaneously. However when the cutting edge rotates about a fixed axis above the web this angle cannot be very great or else there will be portions of the cutting edge which do not strike the roller and, as a result, only a relatively small portion of the width of the web will be cut. Accordingly, it has heretofore been the practice in such cases when making wide cuts to arrange the axis of the roller at no more than a slight angle if at all with respect to the cutting edge.

SUMMARY OF THE INVENTION

The present invention provides an anvil unit having a plurality of idler rollers arranged with their axes at a relatively large oblique angle with respect to said rotating cutting edge and arranged side-by-side so that every part of the width of said web passes over some part of a roller against which it can be cut by the rotating cutting edge. Thus, although it is possible to cut only a small portion of the width of the web on any particular roller, the overall effect when the contributions of each roller are taken together and allowed to join up can be a single cut extending across the entire width of the web. The rollers are resiliently mounted so as to avoid being undercut or scarred by the rotating cutting edge.

BRIEF DESCRIPTION OF THE DRAWINGS

Further particulars of this invention will become apparent from a study of the preferred embodiment described below and illustrated in the drawings wherein the same reference numerals indicate the same elements throughout and.

DESCRIPTION OF THE PREFERRED EMBODIMENT

Figures 1, 2, 3:
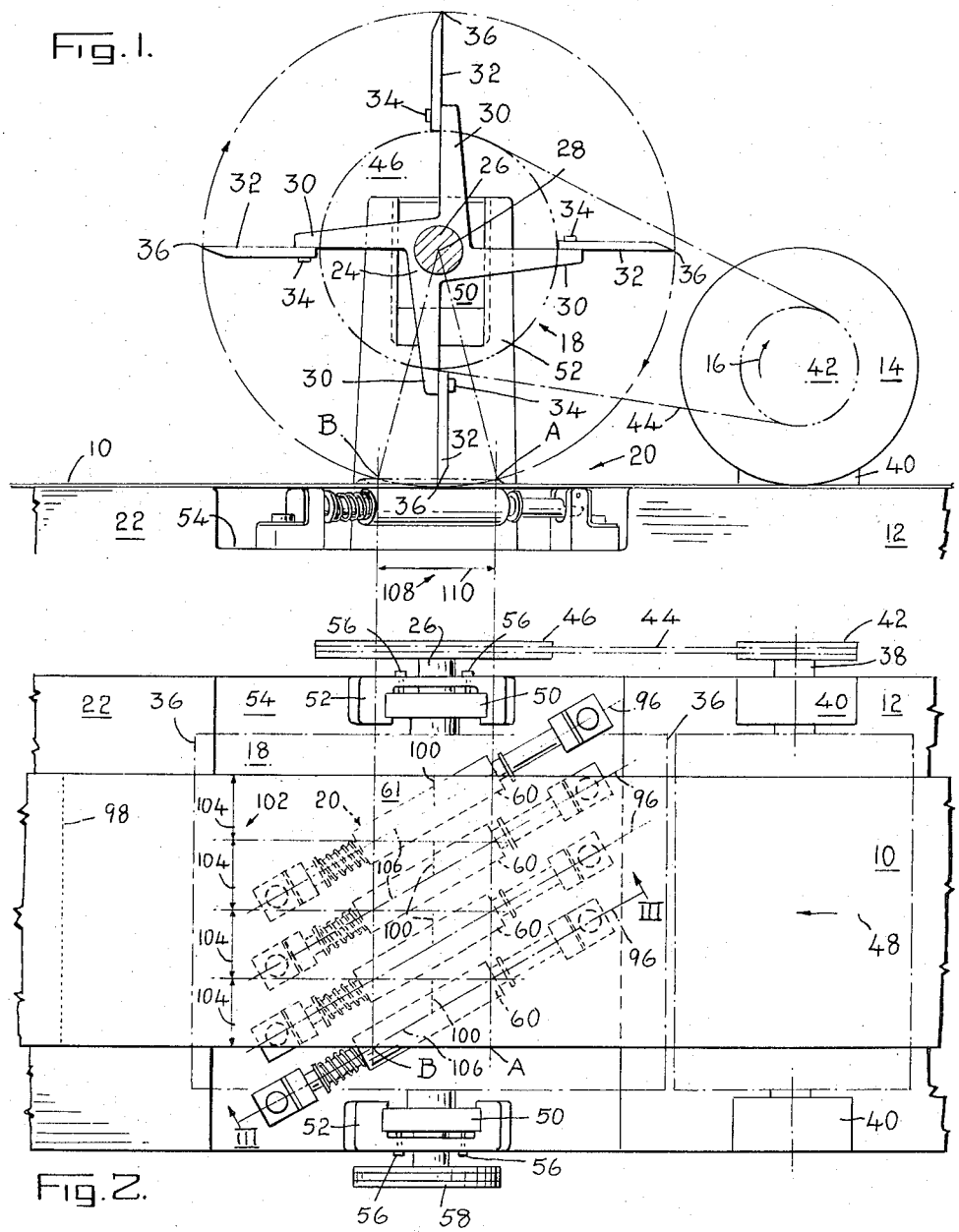
FIG. 1 is a side elevation view of the preferred embodiment in one configuration showing, in broken lines, an idler roller in its original position and, in solid lines, the idler roller deflected downward from its original position and displaced along the shaft on which it is mounted.
FIG. 2 is a top plan view of the preferred embodiment in the same configuration.
FIG. 3 is a section view along the line III — III of FIG. 2 but shows the idler roller of FIG. 1 in its original position.

In FIG. 1 a web 10 of material is advanced uniformly in a plane from right to left over a support 12 by a feed roll 14 which rotates clockwise in the direction of the arrow 16 and presses the web 10 against the support 12. The web 10 then passes between a conventional cutting head 18 and an anvil unit 20 to a second support 22. The cutting head 18 has a collar 24 fixedly supported on an axle 26 which rotates about a cutting axis 28. The collar 24 has four identical arms 30 extending outwardly from and uniformly distributed about the cutting axis 28. At the end of each arm 30, a blade 32 is adjustably attached by a bolt 34 which passes through a slot (not shown) in the blade 32 and is threaded into the arm 30. Each blade 32 has a cutting edge 36 at its outer end and the four cutting edges 36 are maintained equidistant from the cutting axis 28 although the distance between the cutting edges 36 and the cutting axis 28 can be adjusted by loosening the bolts 34 and moving the blades 32 back and forth along the arms 30.

Referring now to both FIGS. 1 and 2, the feed roll 14 is mounted on an axle 38 journalled in and extending between two identical housings 40 secured to support 12. The axle 38 extends through one of the housings 40 to a wheel 42 affixed to the end of the axle 38. The wheel 42 is driven by a belt 44 from a second wheel 46 to rotate the axle 38 and the feed roll 14 in the direction of the arrow 16 of FIG. 1 and thereby advance the web 10 from right to left in the direction of the arrow 48 of FIG. 2. The wheel 46 is affixed on the same side of the web 10 as the wheel 42 to one end of the axle 26 which is journalled in and extends between and through two identical plates 50. The plates 50 are journalled to ride up and down in two identical upwardly tapering frames 52 located on either side of the web 10 and secured to a base 54 extending between the supports 12 and 22. The distance between the web 10 and the cutting axis 28 can therefore be varied by moving the plates 50 up and down in the frames 52 although the plates 50 can be fixed relative to the frames 52 by tightening bolts 56 which pass through vertical slots (not shown) in the frames 52 and are threaded into the plates 50. A third wheel 58 affixed to the other end of the axle 26 from the wheel 46 is driven by a belt (not shown) from a motor (not shown) to rotate the axle 26, the cutting head 18 and the wheel 46. As described above, the wheel 46 in turn drives the wheel 42 through the belt 44.

As best seen in FIG. 2, the anvil unit 20 has four non-coaxial identical idler rollers 60 equally spaced side-by-side across the width of the web 10 and aligned parallel to each other at an oblique angle of 30° to the direction of web travel. The tops of the rollers 60 lie in a common tangential plane 61 parallel to the plane of web travel.

Referring now to FIG. 3, it can be seen that each roller 60 is coaxially mounted on a cylindrical shaft 62 extending between two identical brackets 64 secured to the base 54. The roller 60 has a cylindrical outer portion 66 separated from the shaft 62 by nylon bushings 68 which ensure that the roller 60 is freely rotatable on the shaft 62 about their common axis. A coiled compression spring 70 is coaxially mounted on the shaft 62 so that one end of the spring 70 acts against a retainer ring 72 fixedly located near one end of the shaft 62 while the other end of the spring 70 acts through a slidable washer 74 against the near end of the roller 60 to bias the roller 60 along the shaft 62 towards a neutral position wherein the far end of the roller 60 abuts against a second retainer ring 76 fixedly located on the shaft 62 so that in the neutral position the roller 60 is roughly equidistant from the ends of the shaft 62.

From each end of the shaft 62 a short semi-cylindrical section has been removed to provide a flat top surface 78. Each end of the shaft 62 extends into the corresponding bracket 64 between a first side wall 80 and a parallel second side wall (not shown). An end wall spanning the space between said first and second side walls is provided by an angle segment 82 secured to the base 84 of the bracket 64 by a plug 86. Each end of the shaft 62 rests on a cylindrical rider 88 designed to move up and down in a cylindrical hole 90 provided in the base 84. A coiled compression spring 92 located in the hole 90 biases the rider 88 and the end of the shaft 62 upwards to force the top surface 78 against a pin 94 extending between said first and second side walls. The pins 94 limit the upward movement of the shaft 62. Also, with the particular arrangement illustrated in FIG. 3, the flat surfaces 78 pressing against the pins 94 prevent rotation of the shaft 62 with respect to the brackets 64. However it is not essential to prevent such rotation and it would also be possible to use for example a shaft which does not have semi-cylindrical sections removed from each end but rather has cylindrical ends and therefore can rotate slightly with respect to the brackets 64.

The apparatus described above can be used to make cuts in the web 10 normal to the general direction of web travel. Generally, the cutting edges 36 are straight and extend across the width of the web 10 normal to the direction of web travel. The positions of the blades 32 on the arms 30 and of the plates 50 in the frames 52 are adjusted so that the distance between the cutting axis 28 and the web 10 is slightly less than the distance between the cutting axis 28 and the cutting edges 36. Accordingly, as the cutting head 18 rotates about the cutting axis 28 each of the cutting edges 36 engages the web 10 at position A and presses the web 10 against the rollers 60 until disengaging the web 10 at position B. During this period each of the rollers 60 deflects downward from its original position as shown in broken lines in FIG. 1 to the position shown in solid lines and then returns to its original position when the cutting edge 36 disengages the web 10. That is, undercutting of the roller 60 by the cutting edge 36 is avoided because the roller 60 is resiliently mounted so that each end of the shaft 62 is able to deflect downward by forcing the corresponding rider 88 into the hole 90 to compress the spring 92.

Two other things happen to the roller 60 as the cutting edge 36 proceeds from position A to position B. Firstly, the cutting edge 36 acts through the web 10 to spin the roller 60 about its longitudinal axis 96. Secondly, the cutting edge 36 acts through the web 10 to push the roller 60 along the shaft 62 towards the retainer ring 72 thereby compressing the spring 70. Of course, when the cutting edge 36 disengages the web 10 at position B the spring 70 immediately expands to return the roller 60 smartly to its neutral position adjacent retainer ring 76. To reduce the friction between the roller 60 and the web 10 the surface of the roller 60 is of smooth metal so that little if any of the rotational and longitudinal movement of the roller 60 is transmitted to the web 10 which continues to travel generally in the direction of the arrow 48. Rollers 60 having polished chrome surfaces have been found suitable.

It can therefore be seen that the mechanisms described above serve to dissipate vertical and horizontal forces which might otherwise lead to dulling of the cutting edges 36 and scarring of the surfaces of the rollers 60.

The tendency of the cutting edges 36 to become dulled as they bang against the anvil unit 20 through the web 10 is also reduced by the fact that the rollers 60 are aligned at relatively large oblique angles with respect to the cutting axis 28. Different parts of the width of the web 10 travel over different rollers 60 and although for each roller 60 only a small cut can be made across the width of the web 10, the overall result when the contributions for each roller 60 are taken together may be a single long cut extending across the entire width of the web 10. FIG. 2 shows such a single long cut 98 but also shows a series of small cuts 100 contributed by each roller 60. The small cuts 100 are shown at a stage when a cutting edge 36 is at a position intermediate position A and position B so that the small cuts 100 are not yet completed and have not yet joined together. In order for the small cuts 100 to be normal to the general direction of web travel it is essential that the web 10 and the cutting edge 36 retain their relative alignment and move together at the same rate from position A to position B. In order for the small cuts 100 to join up to form a single long cut 98 as the web 10 progresses from position A to position B it is not essential that the rollers 60 be aligned at an angle of 30° to the direction of web travel or even that they be parallel to each other as long as every part of the width of the web 10 passes over some part of a roller 60 against which it can be cut. It can be seen that this will be true if firstly, on a plane 102 parallel to the cutting axis 28 but normal to the common tangential plane 61, there is slight overlapping between or at least touching of adjacent projections 104 of the portions between position A and position B of the lines of intersection 106 of the rollers 60 and the common tangential plane 61 and secondly, on a plane 108 normal to the cutting axis 28 and to the common tangential plane 61, there is mutual overlapping of the major portions 110 of the projections of the lines of intersection 106 of the rollers 60 and the common tangential plane 61.

In FIG. 2 the single long cut 98 and the small cuts 100 are perforations because the four blades 32 have notched cutting edges 36. Corresponding long and short continuous cuts can be obtained by substituting four blades having continuous cutting edges for the four blades 32 having notched cutting edges 36. Alternating long perforations 98 and long continuous cuts can be obtained by substituting blades having continuous cutting edges only for every other blade 32 having a notched cutting edge 36. The distance between successive long cuts can be doubled simply by removing every other blade from its corresponding arm 30. The number of possible similar variations can be increased by replacing the cutting head 18 by a cutting head having a greater number of arms distributed at a greater variety of angles about the cutting axis. Also, the versatility of the apparatus can be increased by inserting a gear box between wheel 46 and wheel 42 to make it easier to adjust the apparatus so as to maintain the relative alignment of each cutting edge 36 and the web 10 as they move together at the same rate between position A and position B.

Even when the four blades 32 have been replaced by four blades having continuous cutting edges it is possible to make long perforations in the web 10 similar to long perforation 98. For example, each continuous cutting edge can simply be disengaged from the web 10 before reaching position B so that the small continuous cuts corresponding to small perforations 100 are unable to join together. Alternatively, every other roller 60 of the anvil unit 20 can be removed so that as the web 10 progresses from position A to position B not every part of the width of the web 10 passes over a part of a roller 60 against which it can be cut.

It is also possible to replace the blades 32 by blades having cutting edges which are not straight and which do not extend across the entire width of the web 10. For example, it is possible to replace the blades 32 by blades having cutting edges suitably shaped to cut out or perforate around shapes in a web of suitable material so as to produce blanks for such items as playing cards or polyethylene gloves. Of course, long perforations 98 or corresponding long continous cuts can also be provided between the blanks if desired.

The web 10 can be of a wide variety of materials. Suitable materials include cloth, paper, cardboard, polyethylene and other plastics, and thin metal. When the web 10 is of thin metal it may be necessary however to include a hydraulic arrangement in the apparatus to ensure that the cutting head 18 and the anvil unit 20 come together with sufficient force to cut the web 10.

A particular advantage of the present invention is that as the banging of the cutting edges 36 against the anvil unit 20 is reduced or eliminated the speed at which the cutting edges 36 can be rotated increases accordingly. The present invention can therefore be used for high speed cutting operations.

I claim:

1. An apparatus for cutting a web of material that travels generally in a plane, comprising:
   an anvil unit and a cutting head between which the web can travel,
   the anvil unit comprising a plurality of idler rollers having their axes arranged non-coaxially and obliquely to the general direction of web travel so that different parts of the width of the web will travel over different rollers, and every part of the width of the web will travel over some part of a roller against which it can be cut, the rollers having a common tangential plane parallel to their axes and to said plane of web travel, and the cutting head having at least one cutting edge; and
   means for repeatedly moving said cutting edge over a portion of each roller together with and at the same rate as the web to press the web against the roller and thereby cut the web.

2. An apparatus according to claim 1, wherein the moving means comprise means for rotating said cutting edge about a cutting axis parallel to said plane of web travel but normal to the general direction of web travel and wherein, firstly, on a plane normal to the cutting axis and to the common tangential plane, there is mutual overlapping of the major portions of the projections of the lines of intersection of the rollers and the common tangential plane, and secondly, on a plane parallel to the cutting axis but normal to the common tangential plane, there is slight overlapping between adjacent projections of the lines of intersection of the portions of the rollers over which said cutting edge and the web move together and the common tangential plane, the last mentioned projections defining a continuous straight line which is at least as long as the width of the web to be cut.

3. An apparatus according to claim 2, for cutting the web normal to the general direction of web travel wherein said cutting edge is parallel to the cutting axis and the rollers are identical and arranged side-by-side parallel to each other.

4. An apparatus according to claim 3, including first resilient roller mounting means which yield to prevent undercutting of the surfaces of the rollers by said cutting edge when said cutting edge presses the web against the rollers.

5. An apparatus according to claim 4, wherein the first resilient roller mounting means comprises two coiled springs mounted at opposite ends of each roller with their axes generally normal to the axis of the roller.

6. An apparatus according to claim 4, wherein the rollers are mounted on shafts and second resilient roller mounting means bias the rollers along the shafts towards a neutral position.

7. An apparatus according to claim 6, wherein the second resilient roller mounting means comprise a coiled spring mounted on each shaft between one end of the shaft and the adjacent end of the roller, the roller, the shaft and the coiled spring all being coaxial.

8. An apparatus according to claim 3, comprising means for adjusting the distance between said cutting edge and the cutting axis and means for adjusting the distance between the cutting axis and said plane of web travel.

9. An apparatus according to claim 8, wherein the cutting head has a plurality of cutting edges which can be moved sequentially over the rollers.

10. A method for cutting a web of material that travels substantially in a plane, comprising moving a cutting edge over a plurality of non-coaxial idler rollers together with and at the same rate as the web to press the web against each roller and thereby cut the web, the rollers being oblique to the general direction of web travel and staggered so that different parts of the width of the web travel over different rollers and every part of the width of the web travels over some part of a roller against which it can be cut.

11. A method according to claim 10, comprising moving a plurality of cutting edges over the rollers successively.

12. A method according to claim 10, for cutting the web normal to the general direction of web travel, comprising rotating the cutting edge about a cutting axis parallel to said plane of web travel but normal to the general direction of web travel, the cutting edge being parallel to the cutting axis and the rollers being parallel to each other.

13. A method according to claim 12, for making continuous cuts normal to the general direction of web travel, comprising moving a continuous straight cutting edge and the web together at the same rate over the rollers until the cuts contributed by each roller join up to form a single continuous straight cut.

14. A method according to claim 12, for making perforations normal to the general direction of web travel, comprising moving a continuous straight cutting edge and the web together at the same rate over the rollers and then separating the cutting edge from the web before the cuts contributed by each roller join up.

15. A method according to claim 12, for making perforations normal to said direction of web travel, comprising moving a notched straight cutting edge and the web together at the same rate over the rollers.

* * * * *

UNITED STATES PATENT OFFICE
CERTIFICATE OF CORRECTION

Patent No. 3,800,640　　　　　　　　Dated April 2, 1974

Inventor(s) ARNOLD VARDEN

It is certified that error appears in the above-identified patent and that said Letters Patent are hereby corrected as shown below:

On the cover sheet [76] should read as follows:

-- Arnold Varden, 8 Ottaway Ave., Barrie, Ontario, Canada -- .

Signed and sealed this 13th day of August 1974.

(SEAL)
Attest:

McCOY M. GIBSON, JR.　　　　　　　　C. MARSHALL DANN
Attesting Officer　　　　　　　　　　Commissioner of Patents